US008619749B2

(12) United States Patent
Troemel, Jr.

(10) Patent No.: US 8,619,749 B2
(45) Date of Patent: Dec. 31, 2013

(54) APPARATUS HAVING AND METHOD FOR IMPLEMENTING A DISTRIBUTED ARCHITECTURE FOR RECEIVING AND/OR TRANSMITTING RADIO FREQUENCY SIGNALS

(75) Inventor: Hans Alfred Troemel, Jr., Sharpsburg, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 2375 days.

(21) Appl. No.: 11/230,408

(22) Filed: Sep. 20, 2005

(65) Prior Publication Data

US 2006/0067262 A1    Mar. 30, 2006

Related U.S. Application Data

(60) Provisional application No. 60/611,317, filed on Sep. 20, 2004, provisional application No. 60/611,398, filed on Sep. 20, 2004.

(51) Int. Cl.
    *H04J 3/00*        (2006.01)

(52) U.S. Cl.
    USPC ............... 370/345; 455/569.2; 455/575.1; 455/132; 455/137; 455/138; 455/139; 455/140; 455/99

(58) Field of Classification Search
    USPC ........... 455/569.2, 103, 99, 575.9, 132, 137, 455/138, 139, 140
    See application file for complete search history.

(56) References Cited

U.S. PATENT DOCUMENTS

| 5,831,577 | A | 11/1998 | Nichols et al. |
| 6,512,738 | B1* | 1/2003 | Namekata et al. ............ 370/210 |
| 6,992,638 | B2* | 1/2006 | du Toit et al. ................. 343/776 |
| 7,098,773 | B2* | 8/2006 | Berkman ..................... 370/485 |
| 2001/0024475 | A1 | 9/2001 | Kumar |
| 2002/0102987 | A1* | 8/2002 | Souisse et al. ............... 455/454 |
| 2002/0146990 | A1* | 10/2002 | Riddle .......................... 455/115 |
| 2002/0163981 | A1* | 11/2002 | Troemel, Jr. .................. 375/345 |
| 2003/0083024 | A1 | 5/2003 | Richenstein et al. |
| 2003/0125007 | A1 | 7/2003 | Whikehart et al. |
| 2004/0190660 | A1* | 9/2004 | Morris et al. ................. 375/350 |
| 2005/0032497 | A1* | 2/2005 | Girardeau et al. ............ 455/272 |
| 2005/0227728 | A1* | 10/2005 | Trachewsky et al. ...... 455/552.1 |

FOREIGN PATENT DOCUMENTS

EP    1231672 A2    8/2002

* cited by examiner

*Primary Examiner* — Liton Miah
(74) *Attorney, Agent, or Firm* — Laurence S. Roach (57) ABSTRACT

A distributed architecture system for receiving radio frequency (RF) signals includes a receiving unit receiving a plurality of RF signals. The receiving unit includes means for combining the plurality of RF signals into a multiplexed signal. A head unit receives and separates the multiplexed signal into a plurality of information signals. The head unit prepares the information signals for presentation to a user. The head unit is disposed remotely from the receiving unit. A multiplexed link carries the multiplexed signal from the receiving unit to the head unit.

25 Claims, 6 Drawing Sheets

APPARATUS HAVING AND METHOD FOR IMPLEMENTING A DISTRIBUTED ARCHITECTURE FOR RECEIVING AND/OR TRANSMITTING RADIO FREQUENCY SIGNALS

CROSS-REFERENCE TO RELATED APPLICATIONS

This application claims the benefit of U.S. Provisional Patent Application Ser. No. 60/611,398, filed 20 Sep. 2004 and entitled RADIO ARCHITECTURE UTILIZING IF I/Q OUTPUT SEPARATION, and of U.S. Provisional Patent Application Ser. No. 60/611,317, filed 20 Sep. 2004 and entitled IF MULTIPLEXED RADIO ARCHITECTURE FOR AUTOMOTIVE ENTERTAINMENT EQUIPMENT.

FIELD OF THE INVENTION

The present invention relates generally to an apparatus having and method for implementing a distributed architecture for receiving and/or transmitting radio frequency signals.

DESCRIPTION OF THE RELATED ART

Consumers often desire that devices for receiving and/or transmitting radio frequency signals be capable of receiving and/or transmitting data to and/or from several broadcast and/or data services, such as, for example, the global-positioning system service, the AM-FM radio service, one or more satellite digital audio radio services (SDARS), cellular phone service, and/or satellite or broadcast television service. Such a multi-service device conventionally includes a separate processing platform for each desired service. Each processing platform, in turn, typically includes respective circuitry for receiving and down-converting (collectively sometimes referred to hereinafter as "RF sections" or "RF front ends"), demodulating, and performing other processing of the signals to/from the desired service. Thus, a single conventional multi-service device typically includes several separate and distinct processing platforms each of which includes a respective RF front end for processing signals from a corresponding/desired broadcast and/or data service.

Generally, each of those separate RF front ends must be interconnected with a corresponding antenna by high-quality and relatively expensive cables. For example, a conventional multi-service device may require one antenna for the AM/FM broadcast service, another antenna for the cellular and global-positioning services, and yet another antenna for the satellite television service. Each antenna is typically electrically connected to its corresponding RF front end by a cable, such as, for example, a coaxial or similar cable terminated by appropriate connectors.

The signals being carried by the cables from the antennas to the RF front ends of the multi-service device typically are very small in magnitude, such as, for example, several nanovolts. Such small-magnitude signals are susceptible to degradation from conductive electrical noise and radiation interference. Thus, due to the low-level and high frequency of the RF signals, high-quality cables and connectors are often necessary to preserve the integrity of the signals. This need to use several high-quality cables to interconnect the multi-service device to its antennas increases the cost, complexity, and weight of the system.

A conventional multi-service device is typically contained within a single housing. The several RF front ends of the separate processing platforms are therefore in relatively close proximity with various other circuits, such as, for example, a switching power supply, analog-to-digital converters, digital signal processors, audio power amplifiers, relatively high-voltage displays, and various other circuits. An electrically noisy environment is thereby created which may undesirably impact the sensitivity of the RF front ends and may degrade the quality of the received signal. Further, since the single housing must accommodate the several processing platforms and associated circuitry, space within the housing is at a premium and the process of adding enhanced features, additional functions, or expanding the processing capability of the multi-service device is somewhat more complex than it otherwise might be.

Therefore, what is needed in the art is an apparatus and method that reduces the number of processing platforms required to process the multiple broadcast and/or data services being received and/or transmitted.

Furthermore, what is needed in the art is an apparatus and method for reducing the number of cables required to interconnect the antennas with the corresponding processing platforms.

Still further, what is needed in the art is an apparatus and method for preserving the sensitivity of the RF front ends and the integrity of the analog intermediate-frequency (IF) signals each RF front end provides to its corresponding demodulation/channel decoder.

Moreover, what is needed in the art is an apparatus and method for implementing a distributed architecture in a multi-service device and which accomplishes the foregoing.

SUMMARY OF THE INVENTION

The present invention provides a distributed architecture system for receiving radio frequency (RF) signals.

The invention comprises, in one form thereof, a receiving unit receiving a plurality of RF signals. The receiving unit includes means for combining the plurality of RF signals into a multiplexed signal. A head unit receives and separates the multiplexed signal into a plurality of information signals. The head unit prepares the information signals for presentation to a user. The head unit is disposed remotely from the receiving unit. A multiplexed link carries the multiplexed signal from the receiving unit to the head unit.

An advantage of the present invention is that the RF front ends are distributed away from the electrically-noisy environment of the multi-service device to positions proximate their corresponding antenna thereby preserving if not improving the sensitivity of the RF sections.

A further advantage of the present invention is that the RF front ends are connected to their corresponding demodulators/channel decoders by a single cable, thereby simplifying and reducing the cost and weight of the system.

A still further advantage of the present invention is that by distributing the RF front ends to positions proximate the antennas additional space is made available within the multi-service device.

BRIEF DESCRIPTION OF THE DRAWINGS

The above-mentioned and other features and advantages of the present invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting in any manner the scope of the invention.

DETAILED DESCRIPTION

Figure 1:
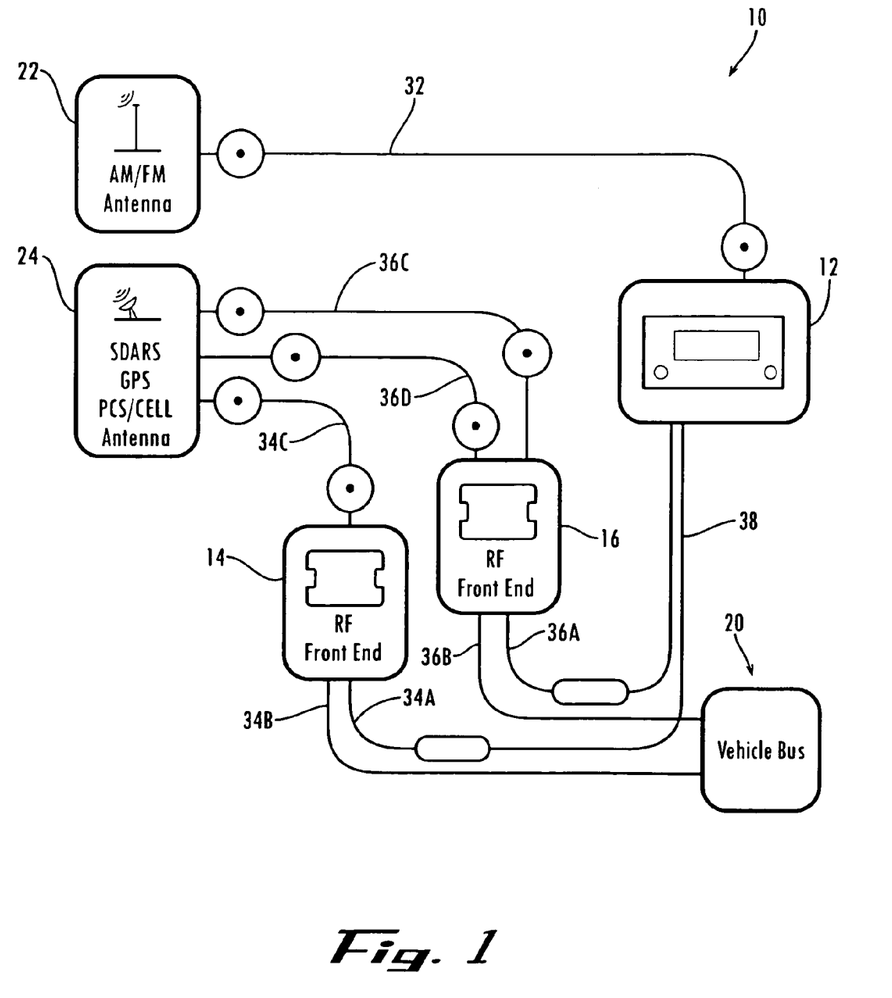
FIG. 1 is a block diagram of an exemplary multi-service device having a conventional architecture for receiving and/or transmitting radio frequency signals.

Referring now to the drawings and particularly to FIG. 1, there is shown a schematic diagram of a conventional distributed architecture system 10 for receiving and/or transmitting radio-frequency signals. Conventional-architecture system 10 includes a control or head unit 12, first and second RF front end sections 14 and 16, entertainment bus 20, and first and second antennas 22 and 24.

Head unit 12 includes various functional units or circuits, such as, for example, amplification circuits, an AM/FM tuner circuit, audio control circuitry including volume, tone and fade/balance control circuitry, input source selection circuitry and other control circuitry (none of which are shown). Head unit 12 is typically installed in a vehicle, such as, for example, an automobile. However, it is to be understood that the present invention is not so limited.

Head unit 12 is electrically interconnected with first antenna 22 via cable 32, with first RF section 14 via cable 34A, with second RF section 16 via cable 36A, and with vehicle bus 20 via cable 38. Generally, RF Sections 14 and 16 receive broadcast RF signals from a corresponding broadcast service and down convert and demodulate those signals into informational and/or data signals. Cables 34A and 36A carry those informational and/or data signals, such as, for example, audio and/or video signals, from RF section 14 and 16, respectively, to head unit 12. Cables 34A and 36A may, for illustrative purposes only, be considered as comprising at least part of an audio bus (not referenced) that carries audio signals from the various RF sections to head unit 12. Cable 38 carries control and/or data signals between vehicle bus 20 and head unit 12.

First RF section 14 is also electrically interconnected with vehicle bus 20 via cable 34B, and with second antenna 24 via cable 34C. Cable 34B carries control and/or data signals between vehicle bus 20 and RF section 14. Cable 34C carries radio-frequency signals between first RF section 14 and second antenna 24. The radio-frequency signals carried by cable 34C typically have a frequency of at least 1.0 GHz (gigahertz) and a very small magnitude of a few nanovolts, and are thus susceptible to degradation in an electrically noisy environment. As a result, cable 34C must be a relatively high-quality and well-shielded cable to preserve the integrity of the RF signals and is therefore relatively expensive.

Second RF section 16 is also electrically interconnected with vehicle bus 20 via cable 36B, and with second antenna 24 via cables 36C and 36D. Cable 36B carries control and/or data signals between vehicle bus 20 and RF section 16. Second RF section 16 is configured to receive and/or transmit radio frequency signals from and/or to two different broadcast and/or data services. Thus, cables 36C and 36D carry respective radio-frequency signals between second RF section 16 and second antenna 24. The respective radio frequency signals carried by cables 36C and 36D also have frequencies typically in excess of 1.0 GHz (gigahertz) and are very small in magnitude, and are thus also susceptible to degradation in an electrically noisy environment. As a result, cables 36C and 36D must also be relatively high-quality and well shielded cables if the integrity of the RF signals is to be preserved. Thus, cables 36C and 36D are also relatively expensive cables.

As shown in FIG. 1 and as described above, conventional distributed architecture system 10 requires multiple RF sections 14 and 16, multiple information and/or data lines 34A and 36A connecting the RF sections with the head unit, multiple control and/or data lines 34B and 36B connecting the RF sections with bus 20, and multiple cables connecting each of the multiple RF sections with its corresponding antenna.

Conversely, the present invention reduces the need for multiple RF sections, multiple information and/or control/data lines, and multiple antenna cables by utilizing an improved distributed architecture. More particularly, and with reference to FIG. 2, a first embodiment of a system 100 having a distributed architecture for receiving and/or transmitting radio frequency signals is schematically shown. System 100 includes head unit 112, transceiver unit 114 and multiplexed link 116. System 100 is, in this exemplary embodiment, installed in vehicle 118, such as, for example, an automobile.

Figure 2:
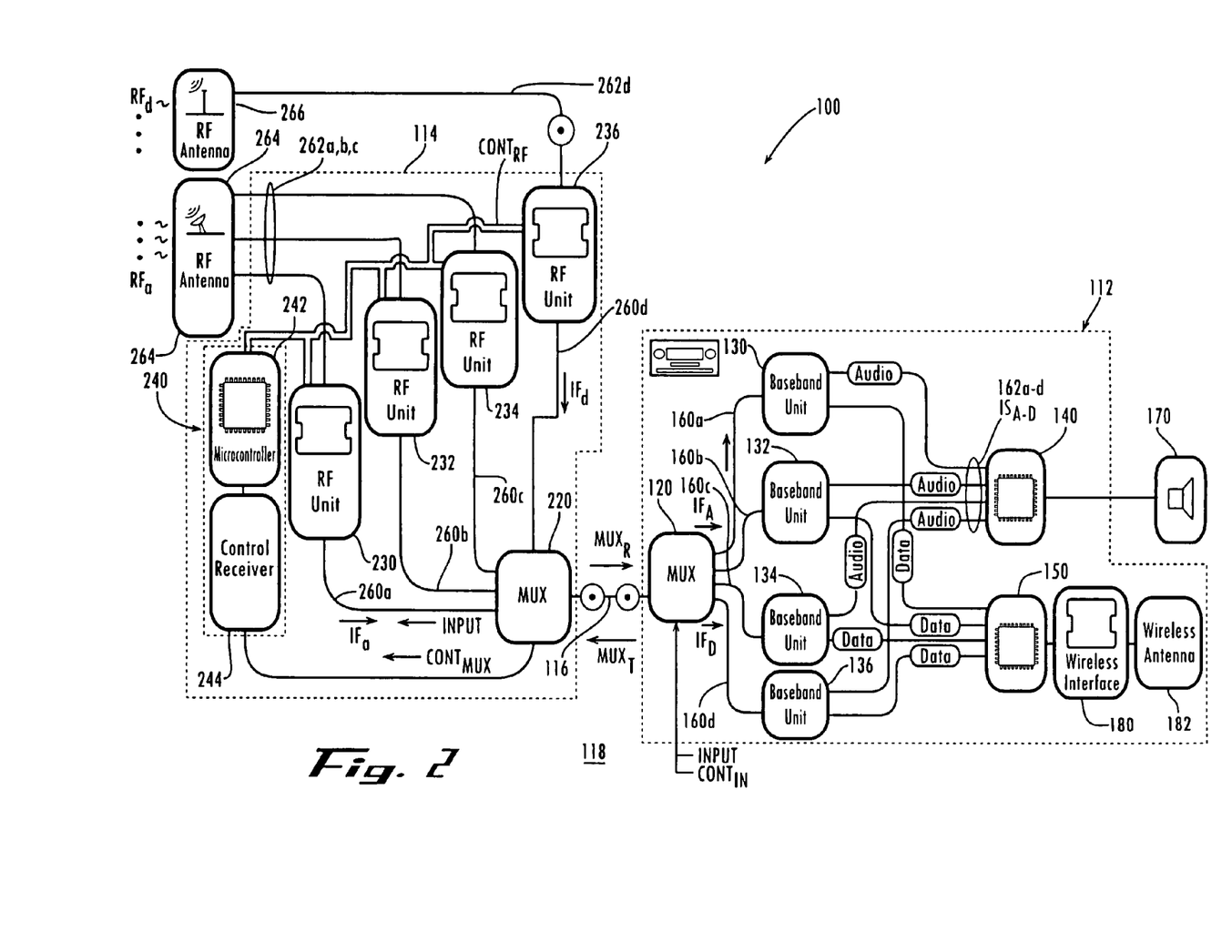
FIG. 2 is a block diagram of one embodiment of an apparatus having a distributed architecture for receiving and/or transmitting radio frequency signals.

Head unit 112 is generally similar to head unit 12 in that it also includes various functional units or circuits, such as, for example, audio control and processing circuitry such as volume, tone and fade/balance control circuitry, input source selection circuitry and other control circuitry. Head unit 112 is also typically installed in a vehicle, such as, for example, an automobile, although it is to be understood that the present invention is not so limited. Head unit 112 is preferably housed and located remotely from transceiver unit 114, such as, for example, in the passenger compartment or area of a vehicle 120.

Generally, head unit 112 receives from transceiver unit 114 via multiplexed link 116 multiplexed signal $MUX_R$. Multiplexed signal $MUX_R$ is a multiplexed down-converted intermediate frequency (IF) signal that combines into a single signal the several radio frequency signals received from the multiple broadcast services that system 100 is configured to receive. Head unit 112 and transceiver unit 114 also exchange control/data and other signals with each other via multiplexed link 116, as is more particularly described hereinafter. Head unit 112 and transceiver unit 114 are electrically interconnected by multiplexed link 116. Head unit 112 includes multiplexer 120, baseband units 130, 132, 134, 136, Information Signal Processor 140, and Control/Data Processor 150.

As used herein, unless otherwise noted, the terms "multiplex", "multiplexing", "multiplexer" and derivatives/variants thereof shall mean the function and/or act, or a device and/or method for performing the function and/or act, of combining two or more individual signals (which can be analog or digital streams) into a combined signal in such a way that the individual signals can later be separated out of and/or derived from the combined signal. The terms "multiplex", "multiplexing", "multiplexer", "demultiplex", "demultiplexing"

and "demultiplexer" and derivatives/variants thereof shall, in context, further encompass the function and/or act, or a device and/or method for performing the function and/or act, of separating the individual signals out of the combined signal.

Multiplexer 120 is electrically connected to multiplexed link 116. Multiplexer 120 is also electrically connected to each baseband unit 130, 132, 134 and 136 via IF signal lines 160a-d, respectively, which carry respective IF signals $IF_{A-D}$ that have been separated from the multiplexed signal $MUX_R$ carried from transceiver unit 114 to head unit 112 via multiplexed link 116. Multiplexer 120, as will be more particularly described hereinafter, separates the plurality of IF signals $IF_{A-D}$ contained within multiplexed signal $MUX_R$ according to a desired multiplexing scheme.

Baseband units 130, 132, 134 and 136, as discussed above, are each electrically connected to multiplexer 120 by respective IF signal lines 160a-d. Each baseband unit 130, 132, 134, and 136 is also connected via respective information signal lines 162a-d to Information Signal Processor 140 and via respective control/data signal lines 164a-d to Control/Data Processor 150. Baseband units 130, 132, 134 and 136 typically include, for example, analog-to-digital converters, digital down converters, channel decoders, and/or source decoders, and are configured as digital signal processor integrated circuits, such as, for example, an NEC 7730 integrated circuit or other circuit similarly configured for demodulating and converting IF signals $IF_{A-D}$ to respective information signals $IS_{A-D}$, such as, for example, audio and/or video signals, and for processing respective control/data signals $CONT_{A-D}$.

Information Signal Processor 140 is a streaming media digital signal processor, such as, for example, an ADSP BF533 (also referred to as a "Blackfin" processor) manufactured by Analog Devices of Norwood, Mass., or other similar streaming media digital signal processor. Information Signal Processor 140 receives information signals $IS_{A-D}$ via information signals lines 162a-d and processes and/or prepares, at least in part, information signals $IS_{A-D}$ for delivery to one or more output devices 170 (only one shown), such as, for example, a speaker or monitor, for presentation to a user, viewer or listener. Information Signal Processor 140 further manages and/or controls the delivery of information signals $IS_{A-D}$ to the one or more output devices 170. Information Signal Processor 140 may also, as is known in the art, perform certain enhancements, such as, for example, equalization, compression and/or decompression, filtering, noise cancellation, and other similar enhancements and/or processing upon information signals $IS_{A-D}$ prior to delivery thereof to the one or more output devices 170.

Control/Data Processor 150, such as, for example, an MGT5200 processor manufactured by Freescale Semiconductor of Austin, Tex., or other similar commercially-available processor, receives control/data signals $CONT_{A-D}$ via control/data lines 164a-d. Control/Data Processor 150 converts and/or processes the received control/data signals $CONT_{A-D}$ into signals (not referenced) that are supplied to other output, control, or interface devices, such as, for example, wireless interface 180 and its associated antenna 182 or other output, control or interface devices (not shown), associated with system 100.

Generally, transceiver unit 114 receives a plurality of radio frequency signals from desired broadcast services and/or other sources, down-converts those signals to IF signals $IF_{A-D}$, and provides those signals to head unit 112 via multiplexed link 116. Transceiver unit 114 also transmits RF signals to those certain services to which it is desired to transmit signals and which are configured to receive such signals, such as, for example, the cellular and/or global positioning services.

Transceiver unit 114 is preferably housed and located remotely from head unit 112, such as, for example, in the trunk or on the rear deck of vehicle 118 and/or proximate associated receiving and/or transmitting antennas to be described hereinafter. Transceiver unit 114 includes multiplexer 220, RF units 230, 232, 234, 236, and link controller 240.

Multiplexer 220 is electrically connected to multiplexed link 116. Multiplexer 220 is also electrically connected to each RF unit 230, 232, 234 and 236 via IF signal lines 260a-d, respectively, which carry IF signals $IF_{A-D}$ corresponding to the radio frequency signals $RF_{A-D}$ received from the multiple broadcast services system 100 is configured to receive. Multiplexer 220 combines, according to a desired multiplexing scheme to be more particularly discussed hereinafter, IF signals $IF_{A-D}$ into multiplexed signal $MUX_R$ which is carried from transceiver unit 114 to head unit 112 via multiplexed link 116. Multiplexer 220 is also electrically connected to controller 240 which, as is described more particularly hereinafter, controls RF units 230, 232, 234 and 236. Multiplexer 220 is further configured to separate multiplexed signal $MUX_T$, which is more particularly described hereinafter and is supplied from head unit 112, into its component signals.

RF units 230, 232, 234 and 236 are electrically connected to multiplexer 220 by respective IF signal lines 260a-d. RF units 230, 232, 234 and 236 are also electrically connected to one or more antennas. In the embodiment shown, RF units 230, 232 and 234 are each electrically connected via RF signal lines 262a, 262b, and 262c, respectively, to a common or shared multi-service antenna 264, whereas RF unit 236 is electrically connected via RF signal line 262d to a single-service antenna 266. RF units 230, 232, 234 and 236 include RF front end receivers, such as, for example, one or more of a satellite data radio service RF front-end receiver, a global positioning system RF front end receiver, a personal communication system and/or cellular RF front end receiver, and an AM/FM RF front end receiver, or other RF front end receivers similarly configured for tuning, receiving and downconverting received RF signals $RF_{A-D}$ to IF signals $IF_{A-D}$.

RF units 230, 232, 234 and 236 also include, as appropriate, RF transmitters which transmit signals and/or data to a corresponding service, such as the cellular or global positioning system services. Thus, one or more RF units 230, 232, 234 and 236 are, as is more particularly described hereinafter, optionally configured as RF transceivers that receive signals from and transmit signals to a desired service, depending upon whether the particular service for which the RF unit is intended to be used requires or benefits from the receipt of signals and/or data from system 100.

Controller 240 includes a control microprocessor 242 and a control receiver 244. Control microprocessor 242 is configured as a microcontroller, such as, for example, an NEC V850 or other similar microcontroller, that is programmed to control RF units 230, 232, 234 and 236 dependent at least in part upon control signals (not referenced) received via control receiver 244. Control receiver 244 receives a combined control signal $CONT_{MUX}$, such as a digital spread spectrum signal, from multiplexer 220 and transforms and/or separates the combined control signal $CONT_{MUX}$ into the one or more control signals contained therein and provides them to control microprocessor 242. Control microprocessor 242, in turn, issues RF control signals $CONT_{RF}$ to each of RF units 230, 232, 234 and 236, and other devices as required. The RF units 230, 232, 234 and 236 receive and/or transmit signals from and/or to a corresponding service dependent at least in part upon RF control signals $CONT_{RF}$.

It should be particularly noted that multiplexers 120 and 220 implement one or more multiplexing schemes or systems which control the multiplexing and exchange of signals on multiplexed link 116 between head unit 112 and transceiver unit 114. Examples of multiplexing schemes suitable for use with the present invention include Frequency Division Multiple Access (FDMA), Direct Sequence Spread Spectrum (DSSS), Frequency Hopping Spread Spectrum (FHSS), Orthogonal Frequency Division Multiplex, or various other suitable multiplexing schemes. Link receiver 244 is configured to be complimentary to the particular multiplexing scheme or schemes used. Thus, for example, where a DSSS multiplexing scheme is used link receiver 244 is configured as a DSSS receiver.

Multiplexed link 116 is an electrically and/or optically conductive cable, such as, for example, a single conductor cable or a coaxial, twin axial, or other suitable cable. When configured as a single conductor cable, multiplexed link 116 carries the multiplexed signals $MUX_R$ and $MUX_T$ between transceiver unit 114 and head unit 112. When configured as a coaxial, twin axial, or other multi-conductor cable, multiplexed link 116, in addition to carrying the multiplexed signals, also carries power from head unit 112 to transceiver unit 114 (or vice-versa) and optionally carries other signals desired to be exchanged between head unit 112 and transceiver unit 114.

It should be particularly noted that signals travel in both directions along multiplexed link 116, i.e., from head unit 112 to transceiver unit 114 and from transceiver unit 114 to head unit 112. More particularly, and as previously described, multiplexed signal $MUX_R$ is transferred from transceiver unit 114 to head unit 112. Conversely, multiplexed signal $MUX_T$ is transferred from head unit 112 to transceiver unit 114. Generally, multiplexed signal $MUX_T$ is a signal formed according to a desired multiplexing scheme, and includes signals and/or data to be transmitted from transceiver unit 114 and associated control signals.

More particularly, multiplexed signal $MUX_T$ combines one or more input signals/data INPUT and associated control signals $CONT_{IN}$ generated by one or more input devices (not shown) associated with head unit 112. The input signals/data INPUT and associated input control signals $CONT_{IN}$ generated by the input devices, and any other necessary control signals (not shown) generated by head unit 112, are provided directly or indirectly, depending on the nature of the input device, to multiplexer 120, which combines INPUT and associated input control signals $CONT_{IN}$ into multiplexed signal $MUX_T$. Thus, for example, with baseband unit 136 configured as a cellular baseband unit, the corresponding RF unit 234 is configured as a cellular service transceiver for receiving and transmitting cellular signals, and cellular input devices, such as, for example, a keypad and microphone (not shown), directly or indirectly provide INPUT and associated input control signals $CONT_{IN}$ to multiplexer 120. Additional control signals (not shown) generated by head unit 112 are also provided to multiplexer 120 and are also combined into multiplexed signal $MUX_T$.

Multiplexed signal $MUX_T$ is transferred from head unit 112 via multiplexed link 116 to multiplexer 220 of transceiver unit 114. Multiplexer 220 separates multiplexed signal $MUX_T$ into its component signals, and directs input signals INPUT to the appropriate transmit units and routes the control signals $CONT_{MUX}$ and $CONT_{RF}$ to link controller 240 and RF units 230, 232 and 234, respectively and/or as appropriate. It should be particularly noted that, although not shown, input signals INPUT and/or input control signals $CONT_{IN}$ are converted from signals of one or more baseband frequencies to signals having intermediate frequencies, prior to or as part of forming multiplexed signal $MUX_T$.

In use, system 100 receives RF signals from several desired broadcast and/or data services. For purposes of this description and as an example, RF unit 230 is configured to receive a commercial satellite radio broadcast service, RF unit 232 is configured as a global positioning system (GPS) receiver, RF unit 234 is configured as a personal communications service/cellular receiver, and RF unit 236 is configured as a conventional AM/FM radio receiver. The RF units tune and receive the RF signals $RF_{A-D}$ of their respective broadcast services and downconvert the RF signals $RF_{A-D}$ to IF signals $IF_{A-D}$.

Figure 3:
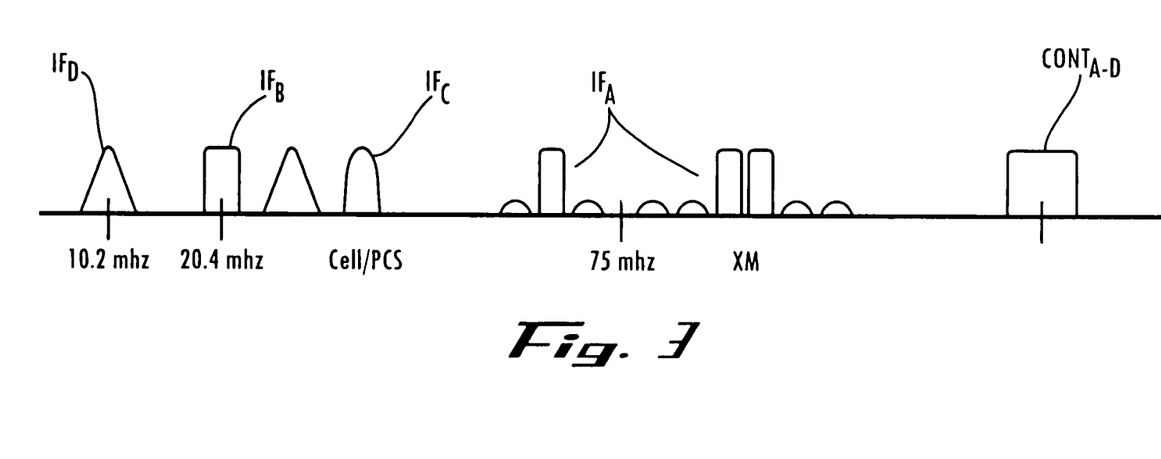
FIG. 3 is a diagram illustrating one exemplary downconversion and multiplexing scheme for use with the present invention.

As shown in the exemplary diagram of FIG. 3, the RF signals $RF_{A-D}$ are downconverted into IF signals $IF_{A-D}$, which are multiplexed from transceiver unit 114 to head unit 112 according to the Frequency Division Multiple Access (FDMA) scheme. More particularly, the RF signals $RF_A$ received by RF unit 230 (the satellite unit) are downconverted to IF signals $IF_A$ centered around an intermediate frequency of approximately 75 MHz, the RF signals $RF_B$ received by RF unit 232 (GPS RF unit) are downconverted to IF signals $IF_B$ centered around an intermediate frequency of approximately 20.4 MHz, the RF signals $RF_C$ received by RF unit 234 (PCS/Cell unit) are downconverted to IF signals $IF_C$ centered around an intermediate frequency of approximately 35 MHz, and the RF signals $RF_D$ received by RF unit 236 (AM/FM radio RF unit) are downconverted to IF signals $IF_D$ centered around an intermediate frequency of approximately 10.2 MHz.

The IF signals $IF_{A-D}$ are coupled to multiplexer 220 which combines IF signals $IF_{A-D}$ into one multiplexed signal $MUX_R$ which is placed on multiplexed link 116 and received by multiplexer 120 of head unit 112. Multiplexer 120 separates the MUX signal into its constituent component IF signals $IF_{A-D}$ which are routed to the corresponding baseband units 130, 132, 134 and 136. The baseband units demodulate and convert the IF signals $IF_{A-D}$ to respective information signals $IS_{A-D}$, such as, for example, audio and/or video signals, and respective control/data signals $CONT_{A-D}$, as previously described. The information signals $IS_{A-D}$ are processed by information signal processor 140 in a substantially conventional manner and are presented to the end user, such as, for example, in the form of music from an AM/FM radio station, news from a satellite radio service, and/or navigational information from the GPS service. System 100 is controlled at least in part by Control/Data Processor 150 which executes preprogrammed instructions in order to perform required functions, including interpreting and/or implementing commands represented by control/data signals $CONT_{A-D}$.

System 100 is configured for use with one or more desired services that require or derive utility from signals and/or data provided by system 100 to that service. Thus, one or more of RF units 230, 232, 234 and 236, such as, for example, the RF unit 232 (GPS RF unit) and RF unit 234 (PCS/Cell unit), associated with those services are configured as RF transceivers and transmit signals and/or data to those services. More particularly, one or more of the RF units 230, 232, 234 and 236 provide one or more input signals INPUT and/or associated input control signals $CONT_{IN}$ to multiplexer 120 which, in turn, combines the several signals into multiplexed signal $MUX_T$. Multiplexed signal $MUX_T$ is transferred from multiplexer 120 to multiplexer 220 where it is separated into its component parts and provided to the intended RF unit and controller 240, as appropriate.

Figure 4:
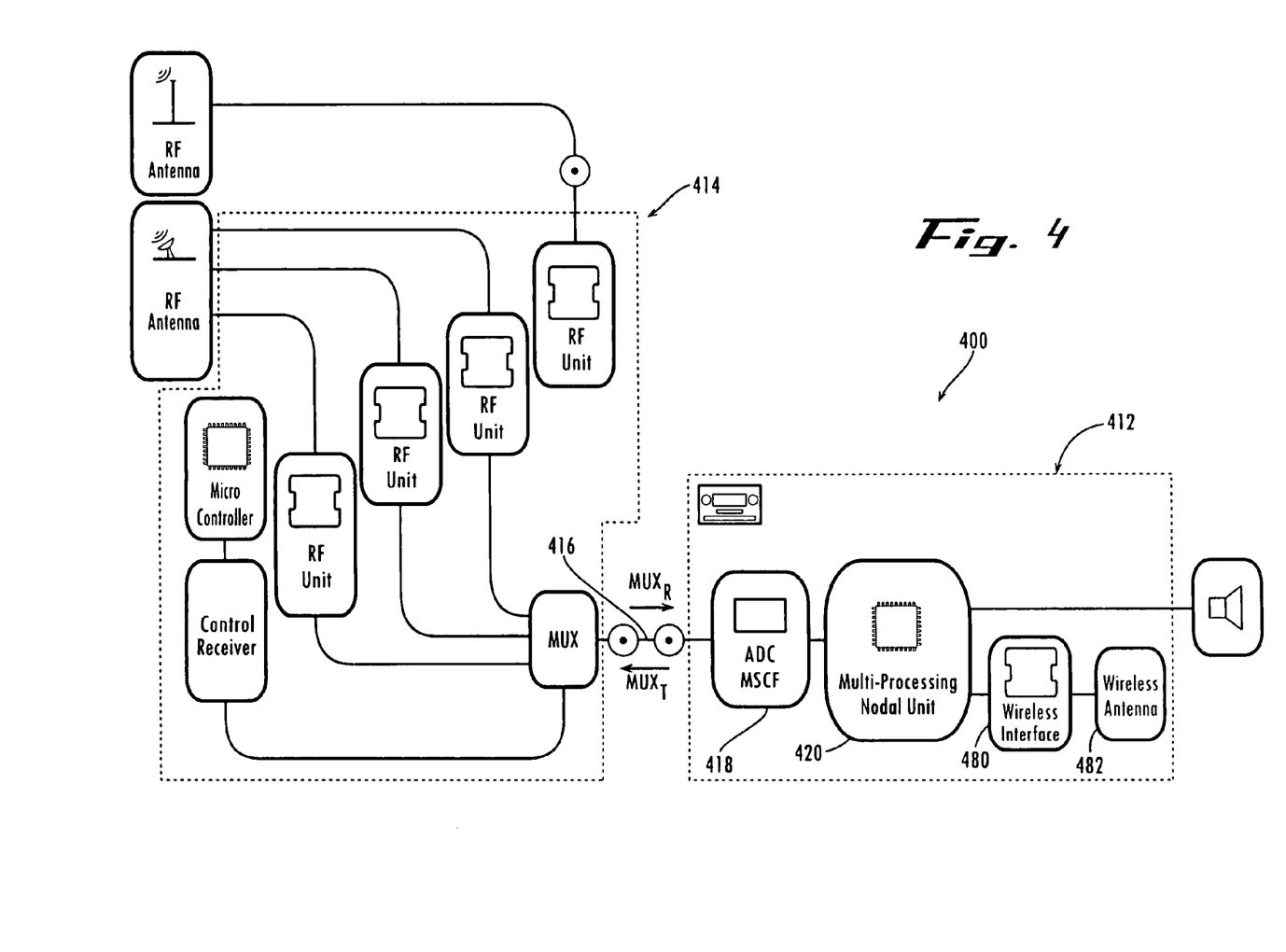
FIG. 4 is a block diagram of another embodiment of an apparatus having a distributed architecture for receiving and/or transmitting radio frequency signals.

Referring now to FIG. 4, there is shown a schematic diagram of a second embodiment of a system 400 having a distributed architecture for receiving and/or transmitting radio frequency signals. System 400 includes head unit 412, receiving unit 414 and multiplexed link 416. Receiving unit 414 and multiplexed link 416 are substantially similar to transceiver unit 114 and multiplexed link 116 described above in connection with system 100, and therefore only head unit 412 is discussed in detail hereinafter.

Head unit 412 includes analog-to-digital conversion and filtering stage (ADCFS) 418 and multi-processing nodal unit 420. Generally, head unit 412 receives from receiver unit 414 via multiplexed link 416 a multiplexed down-converted intermediate frequency (IF) signal that combines into one signal the several radio frequency signals received from the multiple broadcast services that system 400 is configured to receive.

ADCFS 418 includes circuitry (not shown) for performing a conventional analog-to-digital conversion of multiplexed signal $MUX_R$ and a switched capacitor network which downconverts multiplexed signal $MUX_R$ into a near-baseband signal. Such a switched capacitor network is described in more detail by International PCT Patent Publication Number WO 02/089312, entitled Switched Capacitor Network for Tuning and Downconversion filed by Matsushita Communication Industrial Corporation of U.S.A. and inventor Troemel, Hans A., Jr., on 1 May 2002, the entire disclosure of which is incorporated herein by reference. Generally, ADCFS 418 transforms multiplexed signal $MUX_R$ into and provides to multi-processing nodal unit 420 a plurality of downconverted near-baseband signals NB signals, each including respective first and second phase signals (not shown).

Multi-processing nodal unit 420, as is know in the art, includes and/or performs the functions of a microprocessor, digital signal processor, and logic circuitry such as a field programmable grid array. Multi-processing nodal unit 420 is programmed to demodulate and otherwise process NB signals into signals (not referenced) that are supplied to output, control, or interface devices, such as, for example, wireless interface 480 and its associated antenna 482, cellular phone, or other output, control or interface devices (not shown), associated with system 400.

Figure 5:
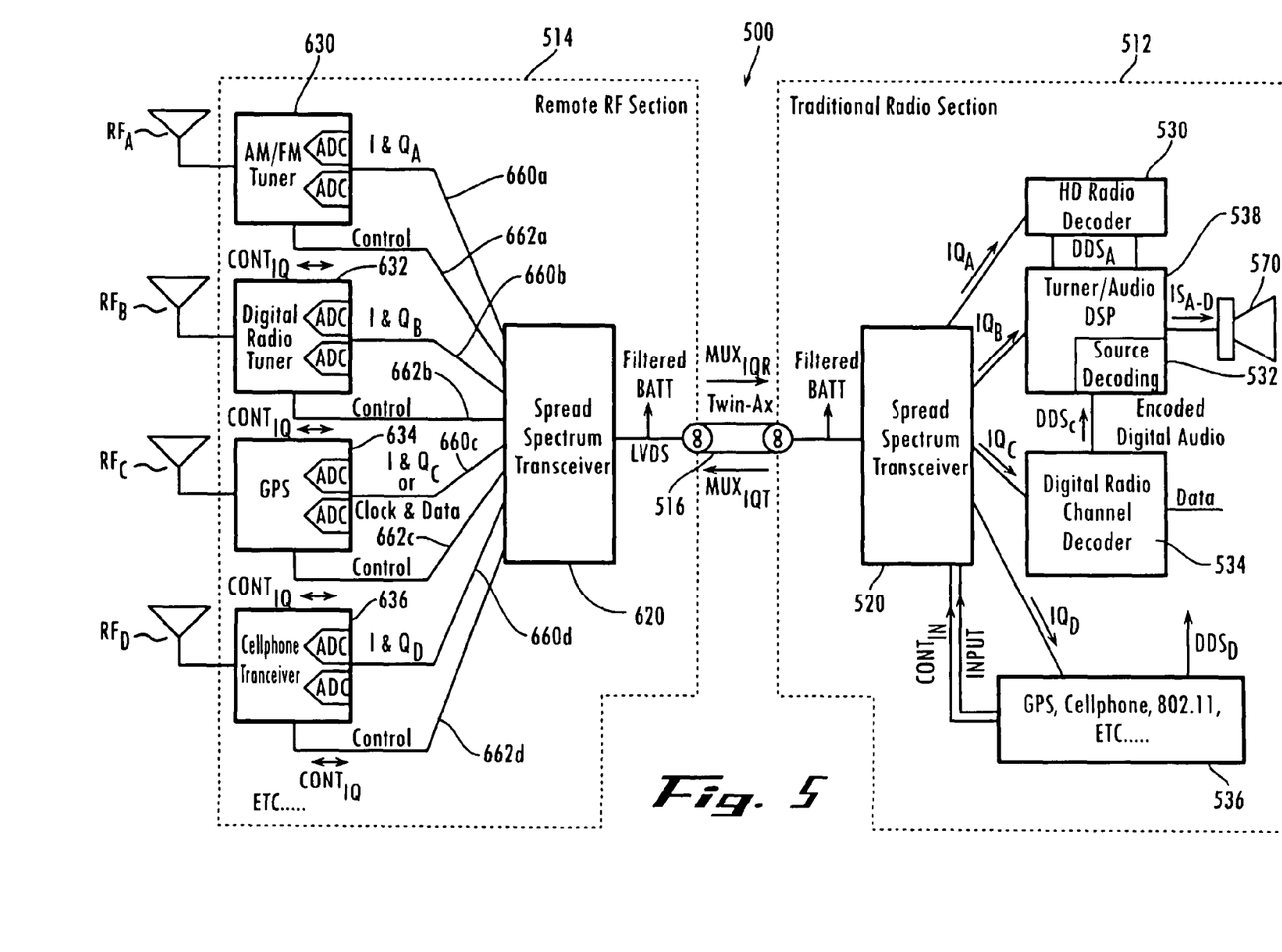
FIG. 5 is a block diagram of a still further embodiment of an apparatus having a distributed architecture for receiving and/or transmitting radio frequency signals.

Referring now to FIG. 5, there is shown a schematic diagram of yet another embodiment of a system 500 having a distributed architecture for receiving and/or transmitting radio frequency signals. System 500 includes head unit 512, transceiver unit 514 and multiplexed link 516.

Head unit 512 is generally similar to head unit 112 in that it also includes various functional units or circuits, such as, for example, audio control and processing circuitry such as volume, tone and fade/balance control circuitry, input source selection circuitry and other control circuitry. Head unit 512 is also typically installed in a vehicle, such as, for example, an automobile, although it is to be understood that the present invention is not so limited. Head unit 512 is preferably housed and located remotely from transceiver unit 514, such as, for example, in the passenger compartment or area of a vehicle.

Generally, head unit 512 receives from transceiver unit 514 via multiplexed link 516 a multiplexed digital in-phase and quadrature (I&Q) digital spread spectrum signal $MUX_{IQR}$ that includes the several radio frequency signals received from the several broadcast services and control signals associated therewith and/or generated by transceiver unit 514.

More particularly, head unit 512 is electrically connected to transceiver unit 514 via multiplexed link 516. Head unit 512 includes spread spectrum transceiver 520, decoders 530, 532, 534 and 536, and digital signal processor 538.

Spread spectrum transceiver (SST) 520 is electrically connected with each decoder 530, 532, 534 and 536 and with multiplexed link 516. SST 520 receives I&Q multiplexed spread spectrum signal $MUX_{IQR}$ from transceiver unit 514 via multiplexed link 516 and separates multiplexed signal $MUX_{IQR}$ into digital I&Q signals $IQ_{A-D}$ that represent the data/content of RF signals $RF_{A-D}$ received from the several broadcast services. Each decoder 530, 532, 534 and 536 receives a respective digital I&Q signal $IQ_{A-D}$. SST 520 separates the plurality of I&Q signals $IQ_{A-D}$ contained within multiplexed signal $MUX_{IQR}$ by correlating to the spreading sequence used to produce multiplexed spread spectrum signal $MUX_{IQR}$. SST 520 also combines input, control and other signals into multiplexed spread spectrum signal $MUX_{IQT}$ which is provided from head unit 512 to transceiver unit 514, as is more particularly described hereinafter.

Decoders 530, 532, 534 and 536 decode the digital I&Q signals $IQ_{A-D}$ and provide a decoded digital signal $DDS_{A-D}$ to digital signal processor 538. Decoders 530, 532, 534 and 536 are configured as, for example, decoders for digital radio, global positioning satellite signals, cellular service and/or personal communication service signals, etc.

Digital signal processor 538 transforms the decoded digital signals $DDS_{A-D}$ into information/entertainment signals $IS_{A-D}$ for delivery to one or more output devices 570 (only one of which is shown), such as, for example, a speaker or monitor, for presentation to a user, viewer or listener. Digital signal processor 538 also, as is known in the art, performs certain other enhancements, such as, for example, equalization, compression and/or decompression, filtering, noise cancellation, and other similar enhancements and/or processing upon information signals $IS_{A-D}$ prior to delivery thereof to the one or more output devices 570.

Digital signal processor 538, or a separate digital signal processor (not shown), receives input signals INPUT and input control signals $CONT_{IN}$ from input devices, such as, for example, a microphone and/or keypad of a cellular device (not shown), associated with head unit 512. Digital signal processor 538 (or a separate digital signal processor) processes input signals INPUT and input control signals $CONT_{IN}$ and provides the signals to SST 520 which, in turn, forms multiplexed spread spectrum signal $MUX_{IQT}$ which includes the input signals INPUT and input control signals $CONT_{IN}$.

Generally, transceiver unit 514 receives a plurality of radio frequency signals $RF_{A-D}$ from desired broadcast services and/or other sources, converts the received radio frequency signals into baseband digital domain I&Q signals $IQ_{A-D}$ of the in-phase and quadrature format, and provides those signals to head unit 512 via multiplexed link 516. Transceiver unit 514 is preferably housed and located remotely from head unit 512, such as, for example, in the trunk or on the rear deck of a vehicle and/or proximate associated receiving antennas to be described hereinafter. Transceiver unit 514 includes spread spectrum transceiver (SST) 620 and RF units 630, 632, 634, and 636.

SST 620 is electrically connected to multiplexed link 516. SST 620 is also electrically connected to each RF unit 630, 632, 634 and 636 via respective I&Q signal lines 660a-d and respective control lines 662a-d. I&Q signal lines 660a-d carry I&Q signals $IQ_{A-D}$ generated by the RF units and which correspond to the radio frequency signals $RF_{A-D}$ received from the multiple broadcast services hat system 500 is configured to receive. Generally, SST 620 spreads the I&Q streaming signals $IQ_{A-D}$, control signals $CONT_{I\&QR}$ associated therewith, and other signals generated by receiving unit 114 as appropriate, to thereby form multiplexed signal MUX-$_{IQR}$, which is provided from transceiver unit 514 to head unit 512 via multiplexed link 516.

Control lines 662a-d carry control signals CONT$_{I\&QR}$ between SST 620 and each of RF units 630, 632, 634 and 636, and carry control signals CONT$_{I\&QT}$ provided to transceiver unit 614 as part of multiplexed signal MUX$_{IQT}$, as will be more particularly described hereinafter.

Control signals CONT$_{I\&QR}$ and CONT$_{I\&QT}$ are configured as low-emission low-power differential signals, such as, for example, signals conforming to the low voltage differential signaling (LVDS) transmission method. Control signals CONT$_{I\&Q}$ and CONT$_{I\&QT}$ in general, manage and control the operation and function of the RF units 630, 632, 634 and 636.

RF units 630, 632, 634 and 636 are electrically connected to SST 620 by respective I&Q signal lines 660a-d and by respective control lines 662a-d. RF units 630, 632, 634 and 636 are also electrically connected to one or more antennas (not referenced) for receiving RF signals RF$_{A-D}$ and, where appropriate, for transmitting RF signals. Each RF unit 630, 632, 634 and 636 is configured as, for example, a TEF6721 HL integrated circuit manufactured by Koninklijke Philips Electronics N.V. or other integrated circuits similarly configured for tuning, receiving, downconverting, and converting the received RF signals RF$_{A-D}$ to digital domain I&Q signals.

Multiplexed link 516 is an electrically and/or optically conductive multi-conductor cable, such as, for example, a twin axial or other suitable multi-conductor cable.

SST 520 and 620 are configured as custom application specific integrated circuits programmed and/or configured to implement a multiplexing scheme or system by which the multiplexing and exchange of signals on multiplexed link 516 between head unit 512 and transceiver unit 514 occurs. Examples of multiplexing schemes suitable for use with the present invention Direct Sequence Spread Spectrum (DSSS), Frequency Hopping Spread Spectrum (FHSS) or other suitable spectrally-efficient multiplexing methods/schemes.

Figure 6:
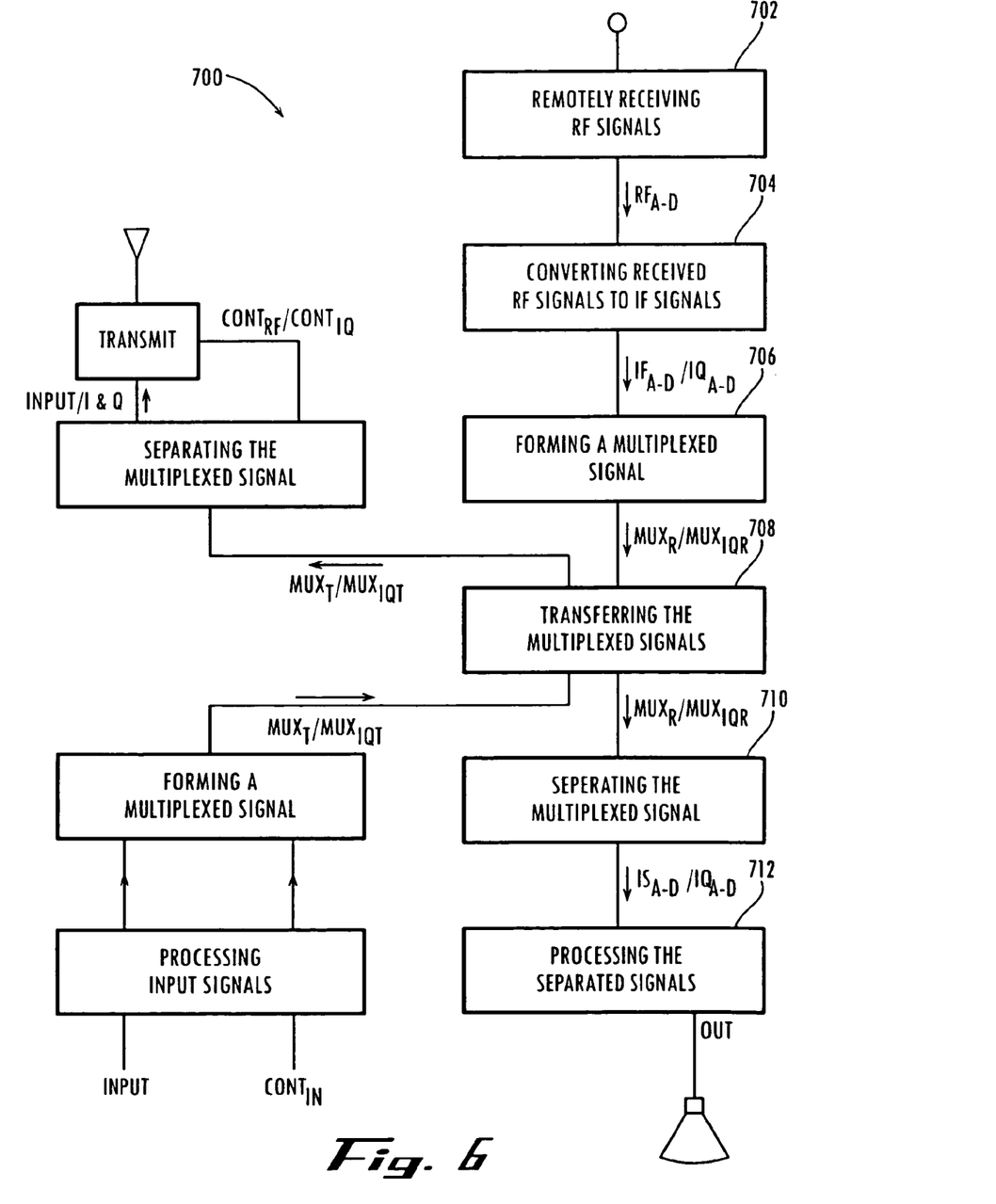
FIG. 6 is a flow diagram illustrating one embodiment of a method for implementing a distributed architecture for receiving and/or transmitting radio frequency signals.

Referring now to FIG. 6, a flow diagram illustrating one embodiment of a method for implementing a distributed architecture for receiving and/or transmitting radio frequency signals is shown. Method 700 includes the processes of remotely receiving radio frequency (RF) signals 702, converting the received RF signals to intermediate frequency (IF) signals 704, forming a receive multiplexed signal 706, transferring multiplexed signals 708, separating the receive multiplexed signal into IF signals 710, processing the separated signals 712, processing input signals 714, forming a transmit multiplexed signal 716, separating the transmit multiplexed signal IF signals 718, and transmitting RF signals 720.

Remotely receiving radio frequency RF signals step 702 includes tuning and receiving several RF signals RF$_{A-D}$ with one or more devices, such as, for example, RF units 230, 232, 234 and 236 (FIG. 3). The remotely receiving radio frequency RF signals step 702 occurs at one or more locations that are remotely disposed relative to a head or control unit, such as, for example, proximate one or more receiving antennas. The received RF signals RF$_{A-D}$ originate from respective radio frequency broadcast and/or data services (not shown). The several RF signals RF$_{A-D}$ are input and/or supplied to converting step 704.

Converting step 704 includes downconverting the received RF signals RF$_{A-D}$ to IF signals IF$_{A-D}$. The IF signals IF$_{A-D}$ may be analog or digital in nature. Thus, converting step 704 optionally includes the step of converting the received RF signals RF$_{A-D}$ to IF signals IF$_{A-D}$ that are in the digital domain, and further optionally includes the step of converting the RF signals RF$_{A-D}$ to digital-domain IF signals IF$_{A-D}$ in the in-phase and quadrature format. The IF signals IF$_{A-D}$ are supplied to the process of forming a multiplexed signal 706.

It should be particularly noted that the receiving and converting steps 702 and 704 may take place in separate physical devices or may be combined into one physical device, such as, for example, RF units 230, 232, 234, 236 (FIG. 3).

Forming a multiplexed signal step 706 includes combining the several IF signals IF$_{A-D}$, and any control signals associated therewith, into a multiplex signal, such as MUX$_R$ and/or MUX$_{IQR}$. Forming a multiplexed signal step 706 combines the several IF signals IF$_{A-D}$ into a multiplex signal according to a desired multiplexing scheme or convention, such as, for example, Frequency Division Multiple Access (FDMA), Direct Sequence Spread Spectrum (DSSS), Frequency Hopping Spread Spectrum (FHSS), Orthogonal Frequency Division Multiplex, or other suitable multiplexing schemes. The multiplex signal is transferred by transferring the multiplexed signal step 708.

Transferring the multiplexed signal step 708 includes placing the multiplex signal onto a multiplexed link, such as, for example, multiplexed link 116 which is configured as, for example, a single, co-axial, twin-axial, or other suitable cable, to thereby provide the multiplex signal to separating the multiplexed signal step 710.

Separating the multiplexed signal step 710 receives the multiplexed signal from transferring the multiplexed signal step 708. Separating step 710 separates the multiplexed signal into its component IF signals IF$_{A-D}$ and any control signals associated therewith. Separating the multiplexed signal step 710 further includes the demodulation and conversion of the IF signals to corresponding information signals, such as, for example, information signals IS$_{A-D}$. The information signals are then provided to processing the separated signals step 712.

Processing the separated signals 712 includes various signal processing and enhancements, such as, for example, equalization, compression and/or decompression, filtering, noise cancellation, and other similar enhancements and/or processing prior to delivery of the signals to one or more output devices, such as, for example, output device 170.

Processing input signals 714 includes receiving one or more input and/or control signals from one or more input devices. The input signals are processed, such as, for example, by a digital signal processor, and provided to the process of forming a transmit multiplexed signal 716.

Forming a transmit multiplexed signal 716 includes combining the one or more input and/or control signals into a transmit multiplex signal, such as, for example, MUX$_T$ and/or MUX$_{IQT}$. The one or more input and/or control signals are combined according to a desired multiplexing scheme or convention, such as, for example, Frequency Division Multiple Access (FDMA), Direct Sequence Spread Spectrum (DSSS), Frequency Hopping Spread Spectrum (FHSS), Orthogonal Frequency Division Multiplex, or other suitable multiplexing schemes. The transmit multiplex signal is transferred by transferring the multiplexed signals step 708 to the process of separating the transmit multiplexed signal 718.

Separating the transmit multiplexed signal 718 receives the transmit multiplexed signal from transferring the multiplexed signal step 708. Separating step 718 separates the transmit multiplexed signal into its component input and control signals. The separated input and control signals are then provided to the process of transmitting RF signals 720.

Transmitting RF signals process 720 receives the separated input and control signals, and transmits the data and/or information corresponding to the input signals dependent at least in part upon and under the control at least in part of the separated control signals.

By remotely locating the sensitive RF units/circuitry of the above-described systems (systems 100, 400 and 500), and/or by remotely locating the receiving function of method 700, relative to the other components and/or functions of those systems and method, several distinct advantages are obtained. First, the RF circuitry is removed and placed relatively distant from the electrically noisy environment of the head unit created by, for example, switching power supplies, digital circuitry, and other conductive electrical noise. In such a distributed architecture system, the design and functionality of the head and radio frequency units are able to evolve separately and as needed.

The multiplexing of the several received signals via a multiplexed link also provides several distinct advantages. Since the multiplexed signal is provided from the remotely-located receiving unit to the head unit of a system using a single and relatively inexpensive cable the present invention reduces the need for expensive optical or other high-capacity cables separately interconnecting each RF or receiving unit with its corresponding front end or baseband unit.

In the embodiment shown, system 100 is configured with RF units 230, 232, 234 and 236 adapted to receive certain broadcast and/or data services, such as, for example, the global positioning system (GPS) service, the personal communications/cellular service, and AM/FM radio service. Such configuration is merely exemplary in nature and is not in any way intended to limit the scope of the present invention. It is to be understood that the present invention can be alternately configured, such as, for example, with RF units 230, 232, 234, 236 adapted to receive virtually any desired broadcast, data, or other content-providing service.

In the embodiment shown, system 100 is configured to downconvert RF signals $RF_{A-D}$ to IF signals $IF_{A-D}$ that are centered around certain respective frequencies to thereby implement a frequency division multiple access multiplexing scheme. Such a configuration is merely exemplary in nature and is not in any way intended to limit the scope of the present invention. It is to be understood that the present invention can be alternately configured, such as, for example, to otherwise convert the RF signals to signals that are compatible with any suitable multiplexing scheme being practiced.

In the embodiment shown, the multiplexed links are described as a cable. However, it is to be understood that the multiplexed link of the present invention can be alternately configured, such as, for example, as a wireless multiplexed link.

The invention claimed is:

1. A device for receiving radio frequency signals, comprising:
   means for receiving a plurality of radio frequency (RF) signals;
   means for combining said plurality of RF signals into a multiplexed signal;
   means for separating said multiplexed signal into a plurality of information signals, each information signal corresponding to a respective one of said plurality of RF signals, said means for separating being disposed remotely from said means for receiving and said means for combining;
   means for providing said multiplexed signal from said means for combining to said means for separating, said means for providing comprising a coaxial cable configured to carry a supply voltage to at least one of said means for separating and said means for combining; and
   means for preparing said information signals for presentation to a user.

2. The device of claim 1, wherein said means for combining and said means for separating comprise respective multiplexers.

3. The device of claim 1, further comprising means for converting said plurality of RF signals into a corresponding plurality of intermediate frequency (IF) signals, said IF signals being combined by said means for combining into said multiplexed signal.

4. The device of claim 3, wherein said means for receiving, said means for converting, and said means for combining are disposed remotely from said means for separating.

5. The device of claim 3, further comprising a plurality of baseband units, each said baseband unit receiving a corresponding one of said plurality of information signals from said means for separating.

6. The device of claim 1, wherein said means for separating comprises a switched capacitor network.

7. The device of claim 6, wherein said switched capacitor network is configured to downconvert the multiplexed signal into a near-baseband signal.

8. The device of claim 1, wherein said means for separating is housed and installed in an automobile.

9. The device of claim 8, wherein said means for separating is housed and installed in a passenger compartment of the automobile, and said means for receiving and said means for combining are housed in one of a trunk and a rear deck of the automobile.

10. The device of claim 1, wherein said means for providing is configured to carry control signals from said means for separating to said means for receiving.

11. The device of claim 1, wherein said means for providing comprises a cable directly interconnecting said means for combining and said means for separating.

12. A distributed architecture system for receiving and processing radio frequency signals, comprising:
   a receiving unit configured for receiving a plurality of radio frequency (RF) signals, said receiving unit including means for combining said plurality of RF signals into a multiplexed signal;
   a head unit receiving said multiplexed signal, said head unit configured for separating said multiplexed signal into a plurality of information signals corresponding to said plurality of RF signals, said head unit configured for preparing, at least in part, said information signals for presentation to a user, said head unit being disposed remotely from said receiving unit; and
   a multiplexed link electrically interconnecting said receiving unit with said head unit, said multiplexed link providing said multiplexed signal to said head unit, said multiplexed link carrying power from one of said head unit and said receiving unit to the other of said head unit and said receiving unit.

13. The system of claim 12, wherein said multiplexed link comprises one of a coaxial cable and a biaxial cable.

14. The system of claim 12, wherein said multiplexed link further carries control signals between said head unit and said receiving unit.

15. The system of claim 12, wherein said receiving unit further comprises means for converting said plurality of RF signals into a corresponding plurality of intermediate frequency (IF) signals, said IF signals being combined by said combining means into said multiplexed signal.

16. The system of claim 15, wherein said IF signals comprise one of analog IF signals, digital IF signals, and in-phase and quadrature IF signals.

17. The system of claim 12, wherein said means for separating comprises a switched capacitor network.

18. In a vehicle, a device for receiving and processing radio frequency signals, comprising:
- a receiving unit configured for receiving a plurality of radio frequency (RF) signals, said receiving unit including means for combining said plurality of RF signals into a multiplexed signal, said receiving unit being disposed at a first location upon the vehicle;
- a head unit receiving said multiplexed signal, said head unit configured for separating said multiplexed signal into a plurality of information signals corresponding to said plurality of RF signals, said head unit configured for preparing, at least in part, said information signals for presentation to a user, said head unit being disposed at a second location upon the vehicle, said second location being disposed remotely from said first location; and
- a multiplexed link electrically interconnecting said receiving unit with said head unit, said multiplexed link providing said multiplexed signal to said head unit, said multiplexed link further carrying power from one of said head unit and said receiving unit to the other of said head unit and said receiving unit.

19. The system of claim 18, wherein said multiplexed link comprises one of a coaxial cable, a biaxial cable, and a wireless link.

20. The system of claim 18, wherein said multiplexed link further carries control signals between said head unit and said receiving unit.

21. The system of claim 18, wherein said receiving unit further comprises means for converting said plurality of RF signals into a corresponding plurality of intermediate frequency (IF) signals, said IF signals being combined by said combining means into said multiplexed signal.

22. The system of claim 21, wherein said IF signals comprise one of analog IF signals, digital IF signals, and in-phase and quadrature IF signals.

23. The system of claim 18, wherein said head unit comprises a switched capacitor network.

24. The device of claim 18, wherein said first location is proximate one or more receiving antennas carried by the vehicle, said second location is proximate a passenger compartment of the vehicle.

25. The device of claim 18, wherein said head unit is housed and installed at the second location upon the vehicle.

* * * * *